United States Patent
Blondel et al.

[11] Patent Number: 6,143,862
[45] Date of Patent: *Nov. 7, 2000

[54] COPOLYAMIDES AND POLYAMIDE COMPOSITIONS, PROCESS OF MANUFACTURE AND APPLICATIONS

[75] Inventors: Philippe Blondel; Thierry Briffaud; Patrick Dang; Thibaut Montanari; Michael Werth, all of Bernay, France

[73] Assignee: Atofina, Paris la Defense Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 09/156,876

[22] Filed: Sep. 18, 1998

[30] Foreign Application Priority Data

Sep. 18, 1997 [FR] France ................................. 97 11647

[51] Int. Cl.⁷ .......................... C08G 73/00; C08G 69/14
[52] U.S. Cl. ...................... 528/310; 528/170; 528/322; 528/323; 528/324; 528/326; 528/332
[58] Field of Search ................................ 528/170, 310, 528/322, 323, 324, 332, 326

[56] References Cited

U.S. PATENT DOCUMENTS

| | | | |
|---|---|---|---|
| 4,837,297 | 6/1989 | Meyer et al. | 528/323 |
| 5,310,860 | 5/1994 | Maj et al. | 528/324 |

FOREIGN PATENT DOCUMENTS

| | | | |
|---|---|---|---|
| 2.044.374 | 2/1971 | France . | |
| 1 595 591 | 5/1970 | Germany . | |
| 2147420 | 9/1970 | Germany . | |
| 4325159A | 11/1992 | Japan . | |

OTHER PUBLICATIONS

English Abstract of DE 2 147 420; Sep. 22, 1970.
English Abstract of JP 4 325159 Nov. 13, 1992.

Primary Examiner—P. Hampton-Hightower
Attorney, Agent, or Firm—Millen, White, Zelano & Branigan, P.C.

[57] ABSTRACT

Colpolyamides resulting from the polycondensation of a mixture of (a) dodecanelactam (L12) or of 12-aminododecanoic acid (A12) and of (b) 11-aminoundecanoic acid (A11) are characterized in that the monomer L12 or A12 represents 1 to 15% or 85 to 99% by weight of the mixture, and the copolyamides have melting points (mp) as a function of the composition, the units originating from the monomer A12 and L12 being in a majority or minority respectively:

(1) A12 or L12 is a majority: mp (° C.)≧176–0.567×(% A11)

(2) A12 or L12 is a majority: mp (°)≧187–0.5×(% A12 or L12), the melting points being determined by taking the peaks of the exotherm signals obtained in differential thermal analysis with a rate of heating of 10° C./minute for the second heating run. Such copolyamides have a property of resilience at low temperature and a property of improved suppleness, especially when plasticizer is added to them. Their ductile/brittle transition temperature is shifted towards a lower temperature.

24 Claims, 2 Drawing Sheets

COPOLYAMIDES AND POLYAMIDE COMPOSITIONS, PROCESS OF MANUFACTURE AND APPLICATIONS

FIELD OF THE INVENTION

The present invention relates to copolyamide thermoplastic resins, to their manufacture and to their applications as resins which are resistant to impact at low temperature and which have good flexibility, especially in the presence of plasticizer(s).

BACKGROUND OF THE INVENTION

Polyamide resins based on homopolymers of 11-aminoundecanoic acid (A11) (it also being possible for these homopolymers to be referred to by the abbreviation PA11) and those based on homopolymers of 12-aminododecanoic acid (A12) or of dodecanelactam (L12) (it also being possible for these homopolymers to be referred to by the abbreviation (PA12) have good properties such as resistance to chemical attacks, flexibility, good dimensional stability due to a low moisture uptake, good resilience, especially at low temperature, and good extrudability.

In the case of the abovementioned applications, investigations are at present being carried out into how to improve further the property of low-temperature resilience and the property of suppleness, especially when plasticizer is added to copolyamides, and to shift the ductile/brittle transition towards a lower temperature.

It has been now surprisingly discovered that this objective can be reached by modifying PA11 with units originating from A12 or L12 and, vice versa, by modifying PA12 with units originating from A11, the monomer compositions of the resulting copolyamides (copolyamides which can be referred to by the abbreviations CoPA 11/12 and CoPA 12/11 respectively) furthermore lying within quite precise ranges, and the said copolyamides exhibiting melting points lying within ranges which are also quite precise. Furthermore, the present invention offers the additional advantage that the CoPA 11/12 copolyamides become much more transparent in relation to the homopolymer resin. As far as known, the copolyamides exhibiting these characteristics have never been described in the literature.

With respect to the literature, copolyamides obtained by polymerization of a mixture of 72 to 82% by weight, preferably 77% by weight, of L12 or of A12 and of 28 to 18% by weight, preferably 23% by weight, of A11, are described in German Patent Application DE-A-2 147 420. However, these copolyamides of CoPA 12/11 type cannot be employed for the applications referred to at present because they are too soft, having too low a melting point (160° C. in the case of CoPA 12/11 of composition 77/23 by weight) and too low a degree of crystallinity. This low degree of crystallinity gives good transparency, but greatly impairs the thermomechanical properties and chemical resistance.

Japanese Patent Application JP-A-04 325 159 relates to 11/12 or 12/11 CoPAs which can be used for the manufacture of blood pouches; the particular weight compositions 65/35 and 82/18 illustrate the 11/12 and 12/11 CoPAs respectively; the melting point is 160° C. in both cases.

SUMMARY OF THE INVENTION

The subject-matter of the present invention is therefore firstly a copolyamide resulting from the polycondensation of a mixture:

of dodecanelactam (L12) or of 12-aminododecanoic acid (A12); and of 11-aminoundecanoic acid (A11), characterized in that the monomer L12 or A12 represents 1 to 15% or 85 to 99% by weight of the mixture, the following relationships being verified for the melting points (mp) as a function of the composition, the units originating from the monomer A12 and L12 being in a majority or minority respectively:

(1) A12 or L12 in majority: mp(° C.)$\geq$176–0.567×(% A11)

(2) A12 or L12 in minority: mp(° C.)$\geq$187–0.5×(% A12 or L12) the said melting points being determined by taking the peaks of the exotherm signals obtained in differential thermal analysis with a rate of heating of 10° C./minute for the second heating run (cf. "Nylon Plastics Handbook" ed. M. I. Kohan Hanser Publisher 1995, pages 70 and 140).

In particular, the melting point of the copolyamide according to the invention is between 167.5 and 178° C. in the case where the units originating from the monomer L12 or A12 are in a majority (CoPA 12/11) and between 179.5 and 190° C. in the case where the units originating from the monomer L12 or A12 are in a minority (CoPA 11/12).

The molecular masses of the copolyamides are expressed by their inherent viscosities ($\eta$inh) in metacresol at 25° C. and at a concentration of 0.5 g/dl (for the definitions of the solution viscosities reference may be made to "Nylon Plastics Handbook" ed. M. I. Kohan Hanser Publishers 1995, page 80). The inherent viscosities of the copolyamides according to the invention are between 1.1 and 2.00, preferably between 1.3 and 2.00, advantageously between 1.45 and 2.00.

The present invention also has as its subject-matter a polyamide composition obtained by compounding at least one copolyamide as defined above with at least one additive chosen from plasticizers, impact additives, phosphoric, phosphorous or hydrophosphorous acid or their esters or sodium or potassium salts or the combinations of these products, these phosphorus derivatives acting as stabilizers, catalysts and additives for controlling the molecular mass, dyes, pigments, optical brighteners, antioxidants, UV stabilizers, chain limiters and reinforcing fillers, and/or with at least one other thermoplastic (co)polymer.

The plasticizers may be any plasticizers known in the field of polyamides and are chosen especially from benzenesulphonamide derivatives, such as n-butylbenzenesulphonamide (BBSA) ("Ucemid A"), ethyltoluenesulphonamide ("Santicizer 8") or N-cyclohexyltoluenesulphonamide ("Santicizer 1H"), esters of hydroxybenzoic acids, such as 2-ethylhexyl para-hydroxybenzoate and 2-decylhexyl para-hydroxybenzoate, lactams such as caprolactam and N-methylpyrrolidone, esters or ethers of tetrahydrofurfuryl alcohol, like oligoethyleneoxytetrahydrofurfuryl alcohol, and esters of citric acid or of hydroxymalonic acid, such as oligoethyleneoxy malonate. A particularly preferred plasticizer is n-butylbenzenesulphonamide (BBSA).

The quantity of plasticizer(s) generally ranges up to 15% by weight relative to the mixture of the copolyamide and of the plasticizer(s).

In the case where BBSA plasticizer is added to the copolyamides according to the invention, the following relationships can be verified for the melting points (mp) as a function of the composition and the quantity of BBSA plasticizer added, the units originating from the monomer A12 or L12 being in a majority or minority respectively:

A12 or L12 in a majority: mp(° C.)≧176−0.567×(% A11)−0.51×(% BBSA)

A12 or L12 in a minority: mp(° C.)≧187−0.5×(% A12 or L12)−0.54×(% BBSA), these relationships applying in the case of contents of comonomer (A11 and A12 or L12 respectively) and/or of BBSA ranging up to 15% by weight relative to the copolyamide.

The impact additives are, for example:

1. polyolefins, which can be defined as polymers including olefin units, like, for example, ethylene, propylene, 1-butene or any other alpha-olefin units; examples which may be mentioned are:

polyethylenes such as LDPE, HDPE, LLDPE or VLDPE, polypropylene, ethylene/propylene copolymers, PES, in particular VLDPEs, obtained with a metallocene as catalyst, ethylene copolymers with at least one compound chosen from the salts or esters of unsaturated carboxylic acids or the vinyl esters of unsaturated carboxylic acids.

LLDPE, VLDPE, polypropylene, ethylene/vinyl acetate copolymers and ethylene/alkyl(meth)acrylate copolymers may be mentioned in particular; the density of the polyolefin may be advantageously between 0.86 and 0.965, and its MFI (Melt Flow Index) may be between 0.3 and 40, 2. block copolymers such as ethylene-propylene rubber copolymers (EPR), styrene-b-butadiene-b-styrene (SBS) copolymers, styrene-b-isoprene-b-styrene (SIS) copolymers, ethylene-b-propylene-b-diene (EPDM) copolymers, ethylene-b-propylene-b-butadiene or isoprene copolymers and styrene-b-ethylene-butene-b-styrene (SEBS) copolymers, such as the copolymer marketed by Shell under the name "Kraton", 3. functionalized polyolefins, which can be defined as polymers including alpha-olefin units and epoxide or carboxylic acid or carboxylic acid anhydride units.

Examples which may be mentioned are the polyolefins 1. and the block polymers 2. grafted with unsaturated epoxides, such as glycidyl (meth)acrylate, and/or with carboxylic acids, such as (meth)acrylic acid, and/or with anhydrides of unsaturated carboxylic acids, such as maleic anhydride.

There may also be mentioned:

copolymers of ethylene, of an unsaturated epoxide and optionally of an ester or a salt of unsaturated carboxylic acid or of a vinyl ester of saturated carboxylic acid. These are, for example, ethylene/vinyl acetate/glycidyl (meth)acrylate copolymers or ethylene/alkyl (meth) acrylate/glycidyl (meth)acrylate copolymers; as examples of the latter there may be mentioned those marketed under the name "Lotader" by Elf Atochem;

copolymers of ethylene, of an anhydride of unsaturated carboxylic acid and/or of an unsaturated carboxylic acid which may be partially neutralized by a metal (Zn) or an alkali metal (Li) and optionally of an ester of unsaturated carboxylic acid or of a vinyl ester of saturated carboxylic acid. These are, for example, ethylene/vinyl acetate/maleic anhydride copolymers or ethylene/alkyl or aryl (meth)acrylate/maleic anhydride copolymers or else ethylene/Zn or Li (meth)acrylate/maleic anhydride copolymers;

polyethylene, polypropylene, ethylene propylene copolymers grafted or copolymerized with an anhydride of unsaturated carboxylic acid and then condensed with a monoamine polyamide (or a polyamide oligomer). These products are described in European Patent EP 342 066.

The functionalized polyolefin is advantageously chosen from ethylene/vinyl acetate/maleic anhydride copolymers, ethylene/propylene copolymers with propylene in a majority, grafted with maleic anhydride and then condensed with monoamine polyamide 6 or monoamine caprolactam oligomers.

Also very particularly mentioned are the ethylene—alkyl or aryl (meth)acrylate—anhydride of unsaturated dicarboxylic acid co- or terpolymers including from 77 to 99.2 mol % of at least one unit derived from ethylene, from 0 to 20 mol % of at least one unit derived from alkyl or aryl (meth) acrylate(s) and from 0.8 to 3 mol % of at least one unit derived from anhydride(s) of unsaturated dicarboxylic acid, and having a melt index of between 0.1 and 400 g/10 min, measured according to NFT standard 51-016 (190° C./2.16 kg load); it being possible for the alkyl groups of the alkyl acrylate or methacrylate forming part of these terpolymers to be linear, branched or cyclic and to contain up to 10 carbon atoms; as examples of alkyl (meth)acrylate forming part of the composition of these terpolymers there may be mentioned methyl acrylate, ethyl acrylate, n-butyl acrylate, isobutyl acrylate, 2-ethylhexyl acrylate, cyclohexyl acrylate, ethyl methacrylate and very particularly ethyl acrylate, n-butyl acrylate and methyl acrylate; by way of examples of anhydrides of unsaturated dicarboxylic acids forming part of the definition of these co- or terpolymers there may be mentioned itaconic anhydride, citraconic anhydride, 2-methylmaleic anhydride, 2,3-dimethylmaleic anhydride, bicyclo[2.2.2]oct-5-ene-2,3-dicarboxylic anhydride, preferably maleic anhydride; by way of preferred examples of these ethylene-alkyl (meth)acrylate-anhydride of unsaturated dicarboxylic acid terpolymers there may be mentioned those marketed under the name "Lotader" by Elf Atochem, 4. ionomers, ethylene/(meth)acrylic acid copolymers, such as that marketed under the name "Surlyn" by DuPont.

Examples of pigments which may be mentioned are titanium dioxide, carbon black, cobalt oxide, iron oxide, nickel titanate and organic pigments like phthalocyanine and anthraquinone derivatives.

Thiophene derivatives may be mentioned as optical brighteners.

The antioxidants are, for example, copper iodide combined with potassium iodide and hindered phenol and hindered amine derivatives.

UV stabilizers which may be mentioned are resorcinol derivatives, benzotriazoles or salicylates.

Chain limiters which may be employed are monocarboxylic or dicarboxylic acids or aliphatic monoamines or diamines.

Examples of reinforcing fillers are wollastonite, ballotini, talc, mica, the mixture of quartz, mica and chlorite known under the name of "plastorite", calcium and/or magnesium carbonate, glass fibres, boron nitride fibres and carbon fibres.

The other thermoplastic (co)polymers are, for example, polyolefins (polyethylene, polypropylene), polyesters (polyethylene terephthalate), poly(butylene terephthalate)), other polyamide resins (PA6 or PA6.6) and fluorine-containing resins like poly(vinylidene fluoride).

The copolyamides according to the invention which have a composition with a majority of units originating from L12 or A12 can be manufactured according to a usual continuous or noncontinuous process for the manufacture of PA12 with the modification that the acid A11 is added to the starting mixture. For example, the continuous processes known from European Patents EP-530 592 and EP-668 309 can be adapted for the manufacture of 12/11 CoPas. The procedure can thus be as follows:

Preparation of a 12/11 CoPA

In a stirred autoclave a charge made up of the mixture of monomers and of 4 to 15% by weight of deionized water relative to the said mixture and, if appropriate, of a plasticizer and/or at least one other additive such as mentioned earlier is heated at a temperature of between 260° C. and 300° C., preferably between 275° C. and 290° C., in autogenous pressure conditions, for a period, which depends on the temperature and pressure conditions, of from 2 to 5 hours, preferably from 2½ to 4 hours, to carry out the conversion of the monomers (polycondensation), and the reactor is then decompressed at a stable temperature for 30 to 60 minutes, preferably for 45 to 55 minutes, to ambient pressure, and the polymerization is finished under inert gas purging or by applying a vacuum for 30 to 180 minutes, preferably for 50 to 90 minutes, it being possible for the duration of the high temperature and pressure plateau to be shortened by an hour in the case where the acid A12 is employed, it being possible for the copolyamide obtained to be blended as a melt with at least one additive as defined above to obtain a polyamide composition.

At the monomer conversion stage, depending on the temperature and the charged water content, the pressure may reach a value of between 15 and 40 bars, preferably lying between 25 and 32 bars. The mixture is maintained in these conditions until the content of unhydrolysed L12 is lower than 2% by weight, preferably lower than 0.5% by weight, to ensure good resin quality.

After the decompression stage the copolyamide is obtained by draining the reactor through the bottom valve, by cooling the reeds in water and by granulating the reeds.

The copolyamide is dried to a moisture content generally lower than 0.25% by weight in the usual equipment for drying granulates. The inherent viscosity corresponds to the above criteria. The residual L12 content is generally lower than 1.0% by weight, preferably lower than 0.5% by weight.

Depending on the particular desired properties, the resin may be taken up with a conventional compounding tool, preferably a continuous single- or twin-screw blender, in order to add to the molten resin phase therein the additives mentioned above, especially the plasticizer, and to disperse them as well as possible.

The copolyamides according to the invention which have a composition with a majority of units originating from A11 can be manufactured according to a noncontinuous conventional process for the manufacture of PA11 with the modification that the acid A12 or the lactam L12 is added to the starting mixture. The procedure may thus be as follows:

Preparation of a CoPA 11/12, the Monomer in a Minority Being Added in the Form of Acid A12

A charge made up of the monomer mixture and of 6 to 20% by weight, preferably 10 to 16% by weight, of deionized water, relative to the said mixture and, if appropriate, of a plasticizer and/or of at least one other additive as mentioned above is heated in a stirred autoclave at a temperature of between 220 and 260° C., preferably between 230 and 240° C., in autogenous pressure conditions, for a period of 1 h 30 min to 3 h 30 min, preferably for 2 h 30 min after the mixture has melted. The reactor is decompressed to ambient pressure for a period of approximately 2 hours and the polymerization is then finished at a temperature of between 240 and 280° C., preferably between 250 and 270° C., under inert gas purging or by applying a vacuum for 30 to 180 minutes, preferably from 50 to 90 minutes, preferably from 60 to 75 minutes, it being possible for the copolymer obtained to be blended as a melt with at least one additive as defined above.

During the monomer conversion stage, conducted with stirring as soon as the starting mixture is molten, the pressure reaches a value of between 7 and 30 bars depending on the temperature and the quantity of water added. In the case where the pressure exceeds 30 bars it can be adjusted by slight decompression of the reactor.

After the decompression the copolyamide is obtained by draining the reactor through the bottom valve, the reeds being cooled in water and granulated. The dried resin corresponds to the same criteria of residual lactam content as those described above.

In all cases the granulates obtained can be mixed with at least one other (co)polymer, especially thermoplastic, examples of which have been given above.

Preparation of a CoPA 11/12, the Monomer in a Minority Being Added in the Form of Lactam L12

A charge made up of the monomer mixture and of 0 to 20% by weight, preferably of 4 to 10% by weight, of deionized water relative to the said mixture and, if appropriate, of a plasticizer and/or of at least one other additive as mentioned above is heated in a stirred autoclave at a temperature of between 250 and 300° C., preferably between 260 and 285° C., in autogenous pressure conditions, for a period of 2 to 5 hours, preferably for 2 to 4 hours after the mixture has melted. During this monomer conversion stage, conducted with stirring as soon as the starting mixture is molten, the pressure reaches a value of between 15 and 60 bars depending on the temperature and the quantity of water added. In the case where the pressure exceeds 30 bars it is preferable to adjust it to this pressure of 30 bars by decompression of the reactor. The reactor is decompressed to ambient pressure for a period of approximately 2 hours and the polymerization is then finished at a temperature of between 240 and 300° C., preferably between 270 and 285° C., under inert gas purging or by applying a vacuum for 30 to 180 minutes, preferably 50 to 90 minutes, it being possible for the copolymer obtained to be blended as a melt with at least one additive as defined above.

After the decompression the copolyamide is obtained by draining the reactor through the bottom valve, the reeds being cooled in water and granulated. The dried resin corresponds to the same criteria of residual lactam content as those described above.

The present invention also relates to the application of the copolyamide as defined above or of the polyamide composition as defined above:

- to the extrusion of flexible tubes for conveying liquids of the solvent or fuel type, in the case of a copolyamide composition with plasticizer;
- to the extrusion of rigid tubes for conveying liquids like petroleum, solvents or water, in particular in high temperature conditions;
- to metal coatings imparting anticorrosion properties, applied by coating or by the technique of dipping in a liquefied resin powder;

to the extrusion of flexible tubes which are resistant to gas pressures at elevated temperatures (compressed air brakes);

to the moulding of objects which have good low-temperature resilience properties;

to the manufacture of objects by rotational moulding of a copolyamide or polyamide composition powder;

the extrusion of very flexible tubes, the copolyamide according to the invention being used in combination with one or more polyolefins;

the coextrusion of tubes, the layer of copolyamide or of copolyamide composition being used in combination with at least one other layer of another thermoplastic resin;

the extrusion of flexible films or of rigid sheets.

The following examples illustrate the present invention without, however, limiting its scope.

EXAMPLE 1

Preparation of a Copolyamide 11/12 (95/5)

Into a 100-l stainless steel autoclave which can be stirred are charged 28.50 kg of 11-aminoundecanoic acid, 1.50 kg of 12-aminododecanoic acid and 7.0 l of water. The mixture is heated to 220° C. over 80 minutes. The molten and stirred mixture is kept at a temperature of between 220 and 235° C. for 80 minutes in autogenous pressure conditions. The pressure reaches 22 bars. Next, the reactor is decompressed to ambient pressure for a period of 3 hours. The polymerization is finished by applying a slight nitrogen purge and by stirring at 15 rev/min for 1 h 20 min. At the end the resin is obtained in the form of a reed through the reactor bottom valve and by cooling it in water.

The characteristics and properties of the resin obtained are reported in Table 1 below.

EXAMPLE 2

Preparation of a Copolyamide 11/12 (90/10)

The procedure is as in Example 1, except that the charges of 11-aminoundecanoic acid and of 12-aminododecanoic acid are 27.00 kg and 3.00 kg respectively.

The characteristics and properties of the resin obtained are reported in Table 1 below.

EXAMPLE 3

Preparation of a Copolyamide 12/11 (94/6)

Into a 960-l reactor of the stirred autoclave type are charged 280 kg of dodecanelactam, 21 kg of water and 18 kg of 11-amino-undecanoic acid. After purges with nitrogen the molten mixture is heated at 280° C. for 3 h 45 min with stirring. The pressure reaches 30 bars. Next, the reactor is decompressed slowly during a period of 5 hours. At the end of the decompression the temperature is lowered to 270° C. The polymerization is taken to completion under nitrogen purging at 270° C. for 2 hours. The resin is discharged through the bottom valve in the form of reeds which are cooled with water and chopped.

The characteristics and properties of the resin obtained are reported in Table 1 below.

EXAMPLE 4

Preparation of a Copolyamide 12/11 (88/12)

The procedure is as in Example 3, except that the dodecanelactam and 11-amino-undecanoic acid charges are 265 kg and 36 kg respectively.

The characteristics and properties of the resin obtained are reported in Table 1 below.

EXAMPLE 5 (COMPARATIVE)

Preparation of a Polyamide 12

The procedure is as in Example 3, except that the only monomer charged is dodecanelactam in a quantity of 300 kg.

The characteristics and properties of the resin obtained are reported in Table 1 below.

EXAMPLE 6 (COMPARATIVE)

Preparation of a Polyamide 11

The procedure is as in Example 1, except that the only monomer charged is 11-amino-undecanoic acid.

The characteristics and properties of the resin obtained are reported in Table 1 below.

EXAMPLE 7

Preparation of a High Viscosity Copolyamide 12/11 (88/12)

The procedure is as in Example 4, except that the polycondensation period is increased to 3 hours.

The characteristics and properties of the resin obtained are reported in Table 1 below.

EXAMPLE 8

Preparation of a High Viscosity Copolyamide 12/11 (94/6)

The procedure is as in Example 3, except that the polycondensation period is increased to 3 hours.

The characteristics and properties of the resin obtained are reported in Table 1 below.

EXAMPLE 9

Preparation of a High Viscosity Polyamide 12

The procedure is as in Example 5, except that the polycondensation period is increased to 3 hours.

The characteristics and properties of the resin obtained are reported in Table 1 below.

TABLE 1

| | | | | | | | Co(polymer) | | | |
|---|---|---|---|---|---|---|---|---|---|---|
| | | | | | | | Notched | | Tensile tests (4) | |
| Example | Monomers (1) - Weight ratio | | Designation | Inherent viscosity | Melting point (° C.) | impact strength at −40° C. (2) (kJ m-2) | Flexural modulus (3) (MPa) | Yield stress (MPa) | Elongation at break (%) |
| 1 | A11/A12 | 95/5 | CoPA11/12 (95/5) | 1.65 | 187 | 16.5 | 1005 | 32.8 | 226 |
| 2 | A11/A12 | 90/10 | CoPA11/12 (90/10) | 1.63 | 185 | 16.0 | 966 | 32.3 | 204 |
| 3 | L12/A11 | 94/6 | CoPA12/11 (94/6) | 1.68 | 174 | 8.6 | 1084 | 38.1 | 254 |
| 4 | L12/A11 | 88/12 | CoPA12/11 (88/12) | 1.65 | 171 | 8.9 | 959 | 36.9 | 245 |
| 5 (comp.) | L12 | | PA 12 | 1.65 | 177 | 7.4 | 1105 | 38.6 | 235 |
| 6 (comp.) | A11 | | PA 11 | 1.65 | 189 | 14.0 | 1010 | 40.0 | 280 |
| 7 | L12/A11 | 88/12 | CoPA12/11 (88/12) high viscosity | 1.88 | 170 | 9.8 | 1055 | 37.6 | 168 |
| 8 | L12/A11 | 94/6 | CoPA12/11 (94/6) high viscosity | 1.87 | 176 | 10.0 | 1117 | 38.9 | 168 |
| 9 (comp.) | L12 | | PA12 high viscosity | 1.88 | 180 | 7.9 | 1134 | 39.6 | 203 |

(1) A11: 11-aminoundecanoic acid; A12: 12-aminododecanoic acid; L12: dodecanelactam
(2) ISO Standard 179/93
(3) ISO Standard 178/93
(4) ISO Standard 527-IB

BRIEF DESCRIPTION OF THE DRAWINGS

Figure 1:
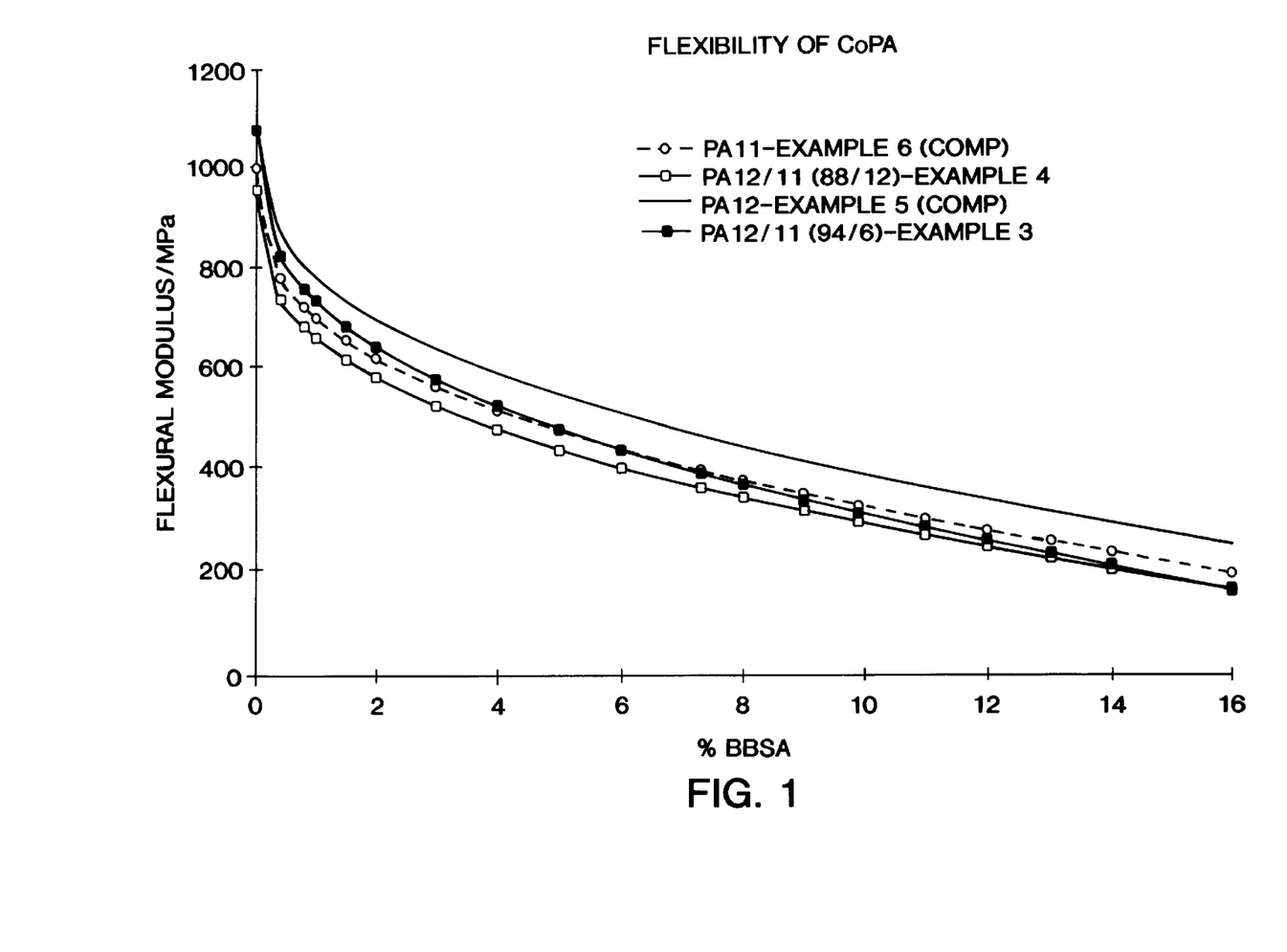
FIGS. 1 and 2 of the attached drawing show, respectively, the change in the flexural modulus (in MPa) as a function of the percentage of BBSA added to the (co)polyamides of Examples 6 (comp.), 4,5 (comp.) and 3, and the change in the resilience of these same (co)polyamides as a function of the temperature.

FIG. 1 shows that the copolyamides 12/11 are made flexible further by the addition of plasticizer. Consequently, the total plasticizer quantity can be reduced to reach a final flexibility which is aimed at.

Figure 2:
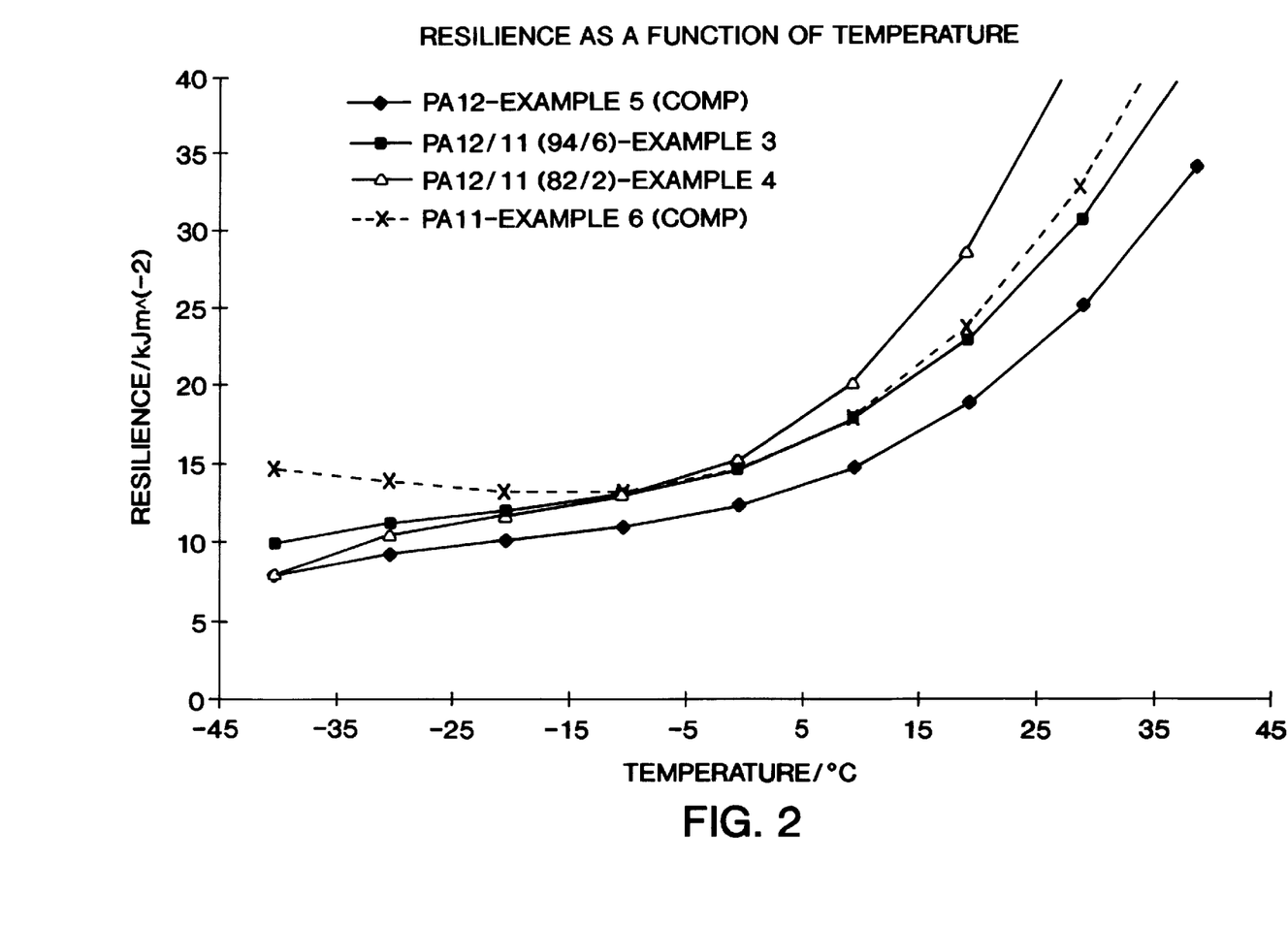

FIG. 2 shows the lowering in the ductile/brittle transition in the case of the copolyamides 12/11.

EXAMPLES 10 to 17

The resins of Examples 3, 4, 5 (comp.) and 6 (comp.) were mixed with n-butylbenzenesulphonamide (BBSA) plasticizer in the quantities shown in Table 2. (Examples 10 to 17 respectively).

The properties of the various resulting resins are reported in Table 2.

TABLE 2

| | Composition of the mixture | | Notched impact | Tensile tests | | |
|---|---|---|---|---|---|---|
| Example | Resin of Example | BBSA in proportion of | strength at −40° C. (kJ m-2) | Flexural modulus (MPa) | Yield stress (Mpa) | Elongation at break (%) |
| 10 | 3[CoPA12/11 (94/6)] | 7%* | 4.8 | 417 | 27.7 | 244 |
| 11 | 4[CoPA12/11 (88/12)] | 7% | 5.8 | 384 | 26.2 | 276 |
| 12 (comp) | 5 (comp.) [PA 12] (PA 12] | 7% | 4.8 | 530 | 28.6 | 261 |
| 13 | 3[CoPA12/11 (94/6)] | 12% | 4.2 | 323 | 24.1 | 285 |
| 14 | 4[CoPA12/11 (88/12)] | 12% | 4.5 | 301 | 22.5 | 301 |
| 15 (comp) | 5 (comp.) [PA12] [PA12] | 12% | 4.1 | 375 | 25.0 | 286 |
| 16 (comp) | 6 (comp.) [PA11] [PA11] | 7% | 10.0 | 410 | 30.0 | 296 |
| 17 (comp) | 6 (comp.) [PA11] | 12% | 4.5 | 300 | 26.8 | 305 |

*the percentages of BBSA are given in relation to the resin

EXAMPLES 18 to 23

Tube Extrusion

With the aid of plasticized compositions of Examples 10 to 15, tubes were extruded, each having an external diameter of 8 mm and an internal diameter of 6 mm, on a Maillefer extruder with a temperature profile of 190–200–220–230–230–230–220–210 (temperatures in ° C.).

The results of the tests conducted on each of these tubes are reported in Table 3.

TABLE 3

| Example | Plasticized CoPA of Example | DIN 73378 impact strength at -60° C. | "General Motors" impact strength at -40° C. | Bursting stress at 23° C. (MPa) | Bursting stress at 100° C. (MPa) | Tube traction-breaking stress (MPa) | SAEJ flexing, strength at 50 mm (N) |
|---|---|---|---|---|---|---|---|
| 18 (comp.) | 15 (comp.) | not broken | 1 broken out of 5 | 24 | 8.5 | 30.4 | 14 |
| 19 (comp.) | 12 (comp.) | not broken | not broken | 30.6 | 10.1 | 36.5 | 18 |
| 20 | 13 | not broken | not broken | 25.6 | 8.9 | 29.6 | 14 |
| 21 | 10 | not broken | not broken | 30.1 | 9.7 | 34.1 | 17 |
| 22 | 14 | not broken | 1 broken out of 5 | 24.4 | 8.2 | 27.9 | 13 |
| 23 | 11 | not broken | not broken | 28.5 | 8.7 | 31.4 | 17 |

The comparison of examples 11 and 15 (comp.) shows that to obtain a similar flexural modulus the CoPA 12/11 needs 5% less of BBSA than for PA 12 homopolymer. The impact strength is also improved by almost 50%.

The comparison of examples 24 (comp.) and 25 in the following Table 4 shows that for equal values of flexural modulus and impact strength the proportion of BBSA plasticizer is lowered for the copolymer 12/11 (94/6) and moreover the inherent viscosity is also lowered 1.60 dl/g against 1.69 dl/g for PA 12 homopolymer.

The comparison of examples 26 (comp.) and 27 shows that the CoPA 12/11 needs less plasticizer and that the impact strength is better that for the PA 12 homopolymer, the inherent viscosity and the flexural modulus being about the same.

The preceding examples can be repeated with similar success by substituting the generically or specifically described reactants and/or operating conditions of this invention for those used in the preceding examples.

The entire disclosure of all applications, patents and publications, cited above, and of corresponding French application No. 97/11647, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

In the claims and specification, the majority refers to the range at least 85% by weight and the minority refers to the range of 1 to 15% by weight.

TABLE 4

| Example | Composition of the mixture Resin of Example | BBSA in proportion of % | Lotader 3410 (impact additive) % | Flexural Modulus MPa (3) | Notched impact strength at -40° C. kJ/m² (2) |
|---|---|---|---|---|---|
| 24 (comp.) | PA12 (inherent viscosity = 1.69 dl/g) | 7.5 | 12 | 360 | 11 |
| 25 | CoPA 12/11 (94/6) (inherent viscosity = 1.60 dl/g) | 6 | 12 | 360 | 11 |
| 26 (comp.) | PA12 (inherent viscosity = 1.36 dl/g) | 7.5 | 12 | 350 | 3.4 |
| 27 | CoPA12/11 (inherent viscosity = 1.37 dl/g) | 6 | 12 | 350 | 5 |

What is claimed is:

1. A copolyamide resulting from the polycondensation of a mixture of:
   (a) dodecanelactam (L12) or of 12-aminododecanoic acid (A12); and
   (b) 11-aminoundecanoic acid (A11),
   wherein the monomer L12 or A12 represents 1–15% weight of the mixture or A12 represents 85–99% by weight of the mixture or L12 represents 85–94% by weight of the mixture and the copolyamide has a melting point (mp) as a function of the composition, the units originating from the monomer A12 and L12 being in a majority or minority respectively:
   (1) A12 or L12 in a majority: mp (° C.)≧176−0.567×(% A11)
   (2) A12 or L12 in a minority: mp (° C.)≧187−0.5×(% A12 or L12),
   said melting point being determined by taking the peaks of the exotherm signals obtained in differential thermal analysis with a rate of heating of 10° C./minute for the second heating run.

2. A copolyamide according to claim 1, wherein melting point is between 167.5 and 178° C. in the case where the units originating from the monomer L12 or A12 are in a majority (CoPA 12/11), and between 179.5 and 190° C. in the case where the units originating from the monomer L12 or A12 are in a minority (CoPA 11/12).

3. A copolyamide according to claim 1, having an inherent viscosity between 1.1 and 2.00.

4. A copolyamide according to claim 3, having an is inherent viscosity is between 1.3 and 2.00, advantageously between 1.45 and 2.00.

5. A copolyamide composition comprising at least one copolyamide as defined in claim 1 with at least one additive selected from the group consisting of plasticizers, impact additives, phosphoric, phosphorous or hydrophosphorous acid or esters or sodium or potassium salts thereof or combinations thereof, dyes, pigments, optical brighteners, antioxidants, UV stabilizers, chain limiters and reinforcing fillers, and with at least one other (co)polymer.

6. A polyamide composition according to claim 5 containing at least one plasticizer chosen from benzenesulphonamide derivatives, esters of hydroxybenzoic acids, lactams, esters or ethers of tetrahydrofurfuryl alcohol and esters of citric acid or of hydroxymalonic acid.

7. A polyamide composition according to claim 6, wherein the plasticizer is n-butylbenzenesulphonamide (BBSA).

8. A polyamide composition according to claim 6, wherein the quantity of plasticizer(s) ranges up to 15% by weight relative to the mixture of the copolyamide and of the plasticizer(s).

9. A polyamide composition according to claim 8, wherein the following melting point (mp) as a function of the composition and of the quantity of BBSA plasticizer added, the units originating from the monomer A12 or L12 being in a majority or minority respectively:

A12 or L12 in a majority: mp($°$ C.)$\geq$176–0.567×(% A11)–0.51×(% BBSA)

A12 or L12 in a minority: mp($°$ C.)$\geq$187–0.5×(% A12 or L12)–0.54×(% BBSA), these relationships applying in the case of contents of comonomer (A11 and A12 or L12 respectively) and/or of BBSA ranging up to 15% relative to the copolyamide.

10. A composition according to claim 5, comprising a polyolefin, a polyester, a different polyamide resin, or a fluorine-containing resin.

11. A process for the manufacture of a copolyamide as defined in claim 1, the units originating from the monomer L12 or A12 being in a majority, characterized in that a charge made up of the mixture of monomer and of 4 to 15% by weight of deionized water relative to the said mixture and, optionally, a plasticizer and/or of at least one other is heated in a stirred autoclave at a temperature of between 260° C. and 300° C., under autogenous pressure conditions, for a period of 2 to 5 hours and the reactor is then decompressed at a stable temperature for 30 to 60 minutes and the polymerization is finished under inert gas purging or by applying a vacuum for 30 to 180 minutes, it being optional for the duration of the high temperature and pressure plateau to be shortened by an hour in the case where 12-aminododecanoic acid (A12) is employed, it being optional for the copolyamide obtained to be blended as a melt with at least one additive.

12. A process for the manufacture of the copolyamide as defined in claim 1, the units originating from the monomer A11 being in a majority and the monomer added being the monomer A12, characterized in that a charge made up of the monomer mixture and of 6 to 20% by weight of deionized water relative to the said mixture and, optionally, of a plasticizer and/or of at least one other additive is heated in a stirred autoclave at a temperature of between 220 and 260° C., in autogenous pressure conditions, for a period of 1 h 30 min to 3 h 30 min, the reactor is decompressed for a period of approximately 2 hours and a polymerization is then finished at a temperature of between 240 and 280° C., under inert gas purging or by applying a vacuum for 30 to 180 minutes, it being optional for the copolymer obtained to be blended as a melt with at least one additive.

13. A process for the manufacture of the copolyamide as defined in claim 1, the units originating from the monomer A11 being in a majority and the monomer added being the monomer L12, characterized in that a charge made up of the monomer mixture and o 0 to 20% by weight of deionized water relative to the said mixture and, optionally, of a plasticizer and/or of at least one other additive is heated in a stirred autoclave at a temperature of between 250 and 300° C., in autogenous pressure conditions, for a period of 2 to 5 hours, the reactor is decompressed for a period of approximately 2 hours and the polymerization is then finished at a temperature of between 240 and 280° C., under inert gas purging or by applying a vacuum for 30 to 180 minutes, it being optional for the copolymer obtained to be blended as a melt with at least one additive.

14. An article of manufacture comprising a copolyamide composition as defined in claim 5, selected from the group consisting of:

extruded flexible tubes containing a plasticizer for conveying liquids of the solvent or fuel type, in the case of a copolyamide composition with plasticizer;

extruded tubes for conveying liquids in particular in high temperature conditions;

metal coatings imparting anticorrosion properties, applied by coating or by the technique of dipping in a liquefied resin powder;

extruded flexible tubes which are resistant to gas pressures at elevated temperatures;

molded objects which have good low-temperature resilience properties;

objects obtained by rotational moulding of a copolyamide or polyamide composition powder;

very flexible extruded tubes, the copolyamide being used in combination with one or more polyolefins;

coextruded tubes, the layer of copolyamide or of copolyamide composition being used in combination with at least one other layer of another thermoplastic resin;

extruded flexible films or of rigid sheets.

15. A copolyamide according to claim 1, wherein A12 or L12 is in the majority.

16. A copolyamide according to claim 1, wherein A12 or L12 is in the minority.

17. A copolyamide according to claim 15, comprising units of A12.

18. A copolyamide according to claim 15, comprising units of L12.

19. A copolyamide according to claim 16, comprising units of A12.

20. A copolyamide according to claim 16, comprising units of L12.

21. A copolyamide composition comprising a plasticizing amount of a plasticizer and a copolyamide resulting from the polycondensation of a mixture of dodecanelactam (L12); and 11-aminoundecanoic acid (A11), wherein the monomer L12 represents 85 to 99% of the copolyamide mixture, and said copolyamide has a melting point: mp ($°$ C.)$\geq$176–0.567×(% A).

22. A copolyamide composition according to claim 21, wherein the plasticizer is selected from the group consisting of benzenesulphonamide derivatives, esters of hydroxyben zoic acids, lactams, esters or ethers of tetrahydrofurfuryl alcohol and esters of citric acid or of hydroxymalonic acid.

23. A copolyamide composition according to claim 22, wherein the plasticizer is n-butylbenzenesulphonamide (BBSA).

24. A copolyamide composition comprising an impact-resistance increasing amount of an impact additive and a copolyamide resulting from the polycondensation of a mixture of dodecanelactam (L12); and 11-aminoundecanoic acid (A11), wherein the monomer L12 represents 85 to 99% of the copolyamide mixture, and said copolyamide has a melting point: mp (° C.)$\geqq 176-0.567 \times (\% A)$.

* * * * *